April 22, 1958 P. WALSH, JR 2,831,443
SEED PLANTER
Filed Feb. 15, 1955 6 Sheets-Sheet 1

INVENTOR.
PETER WALSH, JR.
BY William H. Meagher
ATTORNEY

April 22, 1958 P. WALSH, JR 2,831,443
SEED PLANTER
Filed Feb. 15, 1955 6 Sheets-Sheet 5

INVENTOR.
PETER WALSH, JR.
BY William H. Meagher
ATTORNEY

United States Patent Office 2,831,443
Patented Apr. 22, 1958

2,831,443
SEED PLANTER
Peter Walsh, Jr., Englewood, N. J.

Application February 15, 1955, Serial No. 488,225

21 Claims. (Cl. 111—13)

The present invention relates generally to agricultural apparatus and more particularly to novel apparatus for seed planting and the like.

The sowing of grain was for many centuries accomplished by hand by the so-called "broadcast" method, the sower scattering the seed widely in the air with a sweeping motion of his hand. The use of broadcast methods in the planting of grain is now, however, largely supplanted, particularly in this country, by the use of so-called drill methods, involving the confined delivery of seed to the ground in spaced rows. The conventional grain planting machine is thus a grain drill—a mobile planting device utilizing a set of individual hollow seed tubes extending down toward the soil from a common seed hopper to deliver the grain from the hopper to respective spaced trenches in the soil formed by individually associated furrow openers. The modern grain drill not only represents the mechanization of seed planting operations, but also, with its enclosed delivery of seed to the ground and the resultant restriction of the planted seed to predetermined spaced rows, represents a complete departure from the basic seed scattering principle of the old broadcast method.

In accordance with an embodiment of the present invention, a novel and improved mechanized seed planter is provided utilizing broadcast methods in the delivery of the seed to the soil. A broadcast planter in accordance with the principles of the present invention may be utilized to significant advantage in the sowing of most seeds, other than such inherently "row" crops as corn. By virtue of the provision for truly event distribution of the seed over the entire swath of ground sowed, appreciable improvements in yield may be reasonably anticipated over the yield realized with conventional drills, which confine the seed to uniformly restricted depths of spaced trenches of significantly restricted width relative to the spacing therebetween. A primary object of the present invention is therefore to provide novel and improved seed planting means. A further object of the present invention is to provide a novel seed planting machine of the broadcast type.

In accordance with a particular embodiment of the present invention, a seed hopper is mounted on a wheeled carriage and provided with means for broadcasting seed upon the soil as the carriage is advanced. The seed planting machine is provided with earth-tilling members positioned ahead of as well as behind the seed exits of the advancing hopper. In accordance with a particular feature of the present invention, the leading earth tilling mechanism is adapted to effect a substantial leveling of the soil and a substantial elimination of all regular furrows, the presence of which might attract an undue concentration of seed therein, thus defeating the previously mentioned purposes for broadcasting the seed. In particular, a "head end" earth-tilling arrangement is proposed including a first row of tines particularly adapted to break up and obliterate the treadmarks from the wheels of the tractor or other vehicle hauling the machine, and also including a subsequent row of "cross-tilling" elements—undergoing a translatory motion in a direction perpendicular to the direction of advance of the machine, and thereby achieving an exceptionally effective furrow-leveling action, even obliaterating the marks left by the first row of tines, so that a truly even distribution of the broadcast seed may be realized. Hence, an additional object of the present invention is to provide a broadcast seed planter with novel means for insuring an even distribution over the soil of the broadcast seed. Another particular object of the present invention is to provide a seed planter with novel means for cross-tilling the earth prior to the deposit of seed.

The cultivators at the rear of the machine agitate the soil to cover up the deposited seed. These cultivators are supported by a framework which extends outside the wheels of the machine, thereby permitting soil agitation and seed covering even in the treadmarks of the planting machine's own wheels. A further object of the present invention is thus to provide a novel seed planter permitting sowing and cultivation of a swath of land of greater width than the planter's wheelbase dimension.

It is normally requisite in seed planting combines that means be provided for quickly and effectively raising the cultivating elements out of contact with the earth when desired, as, for example, when the headland is reached and a turn is to be made. In accordance with an embodiment of the present invention, a novel hydraulically powered lifting system is provided whereby the entire rear end cultivating system is raised to a safe level above the ground by means of a pivotal raising of the entire outer framework support thereof relative to the axle-based seed hopper carriage. In further accordance with an embodiment of the present invention, the relative motion between portions of the pivoting framework and the axle-based carriage is utilized to actuate additional mechanisms performing functions corollary to the raising of the rear end cultivating system. In particular, the aforesaid relative motion is separately and automatically translated into: a rotation of the aforementioned front row of tines to positions out of contact with the soil; a rotation of the reciprocating shaft of the aforementioned cross-tilling elements, also raising these out of contact with the earth; a translatory motion of an apertured slide along a side of the seed hopper to close the ports through which the seed is broadcast; and a de-clutching of the drive system for the seed ejecting mechanisms employed to broadcast the seed through the ports. It will be appreciated that the latter two automatic operations insure against undesired spilling and wastage of seed during the headland turns or other maneuvers, etc., when it is not intended that seed is to be sown. It is believed that many of the novel features of the cultivator lifting system and the associated mechanisms briefly described above are applicable to numerous other forms of agricultural machinery in addition to the particular broadcast seed planter described herein, and thus may be used to advantage, for example, in drill-type seed planters also.

Accordingly, it is a further object of the present invention to provide novel and improved implement lifting apparatus for use in agricultural machines. It is also an object of the present invention to provide a seed planting combine with novel and improved means for raising earth-tilling elements out of contact with the soil. Another object of the present invention is to provide a novel and improved combined sowing and cultivating apparatus, wherein pivotal motion of an external framework is utilized to raise the cultivating implements. An additional object of the present invention is to provide a novel and improved planting machine wherein relative motion between a pair of rigid frames is utilized to automatically alter the condition of the machine from a sowing condition to a non-sowing condition.

Other objects and advantages of the present invention may be readily ascertained by those skilled in the art after a reading of the following detailed description and an inspection of the accompanying drawings in which:

Figure 7 is a detail view taken in longitudinal section along the lines 7—7 in Figure 4;

Figure 13a illustrates in enlarged vertical section a thrust bearing for the road wheel axle as shown in Fig. 13;

Figures 1, 15, 16:
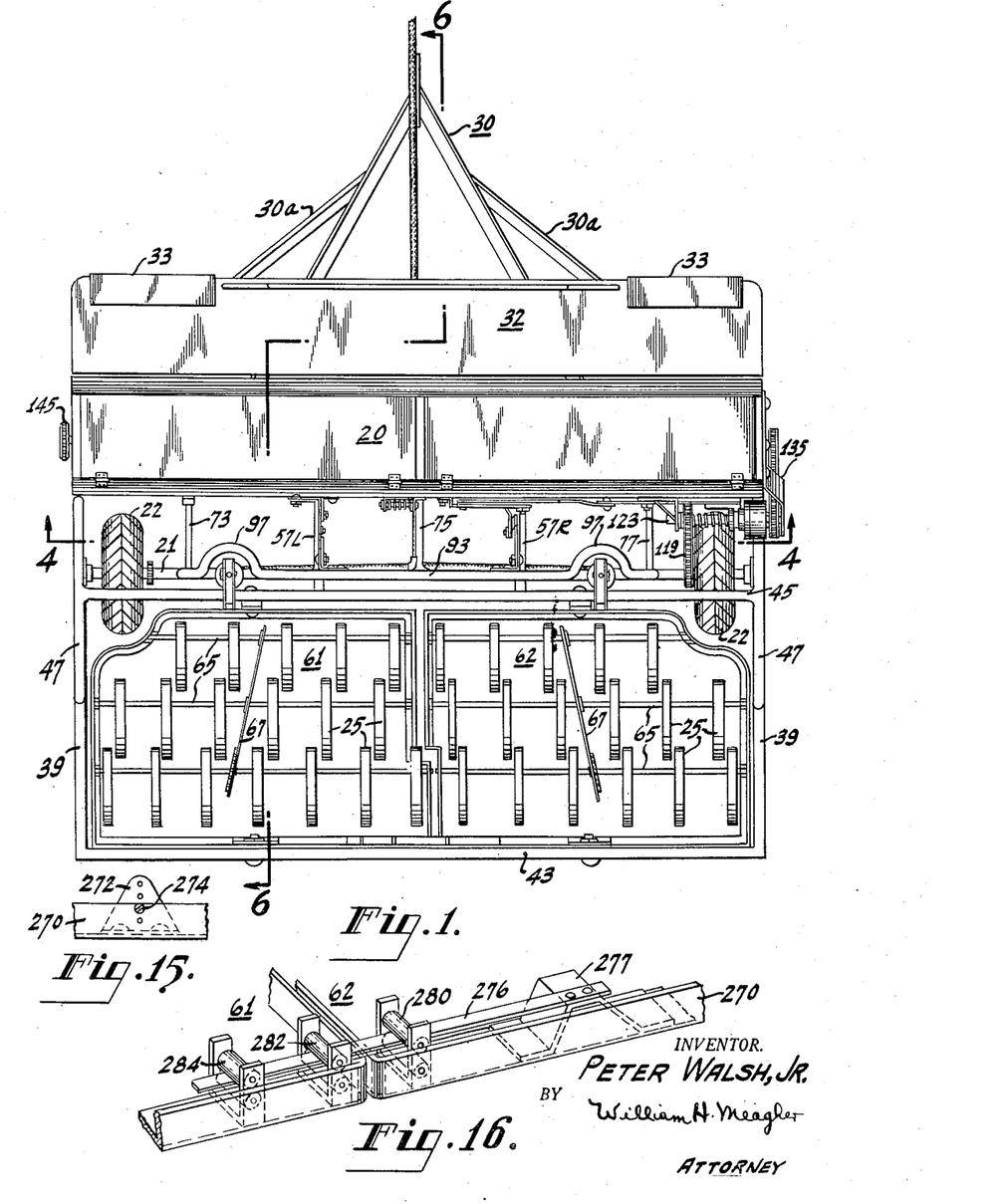
Figure 1 illustrates a plan view of a seed planting machine embodying the principles of the present invention.
Figure 15 is a detail view in elevation of a cultivator frame section.
Figure 16 is an enlarged detail view in perspective of adjacent portions of the cultivator assemblies, illustrating a stabilizer coupling therebetween.
Figures 2, 9, 10, 11:
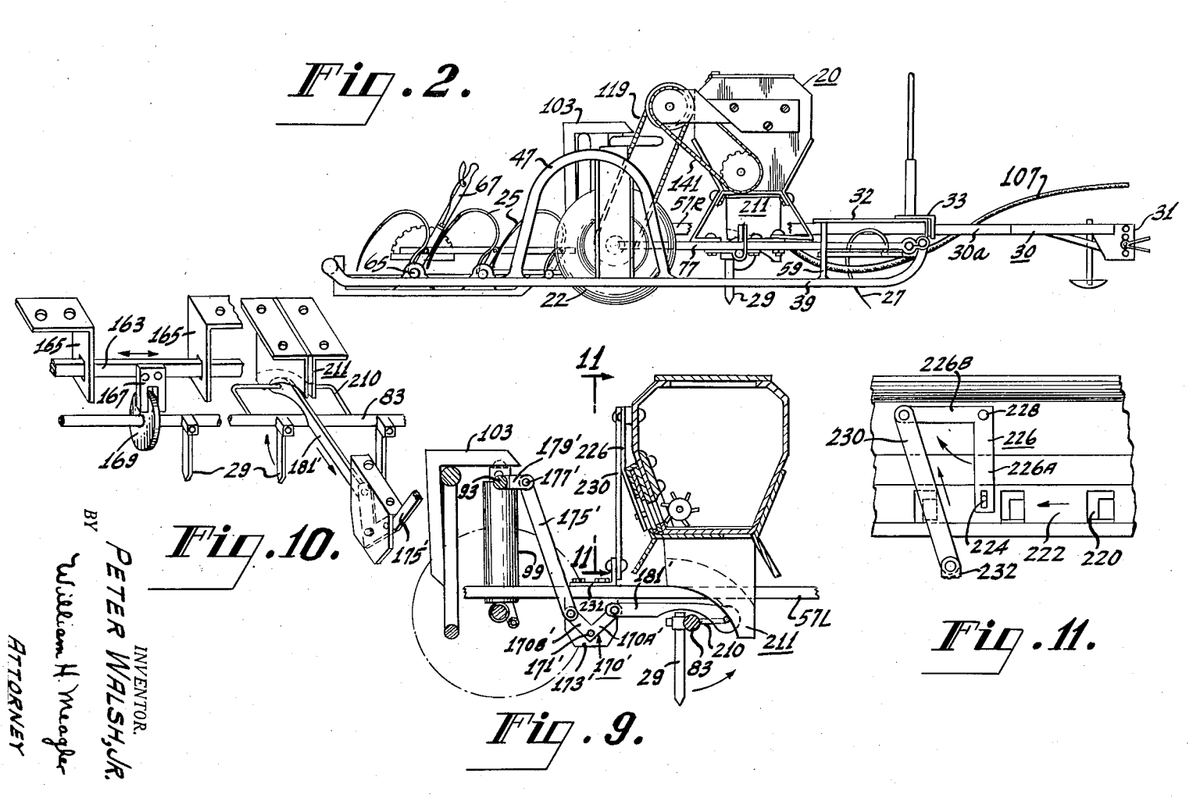
Figure 2 is a view of the machine in side elevation, viewing the machine from the right of Figure 1.
Figure 9 is a detail view taken in longitudinal section along the lines 9—9 in Figure 4.
Figure 10 is a fragmentary perspective view, partly cut away, of apparatus associated with the cross-tilling operation of the machine.
Figure 11 is a fragmentary view of the hopper rear wall in elevation; located on Figure 9 by lines 11—11.
Figure 2:
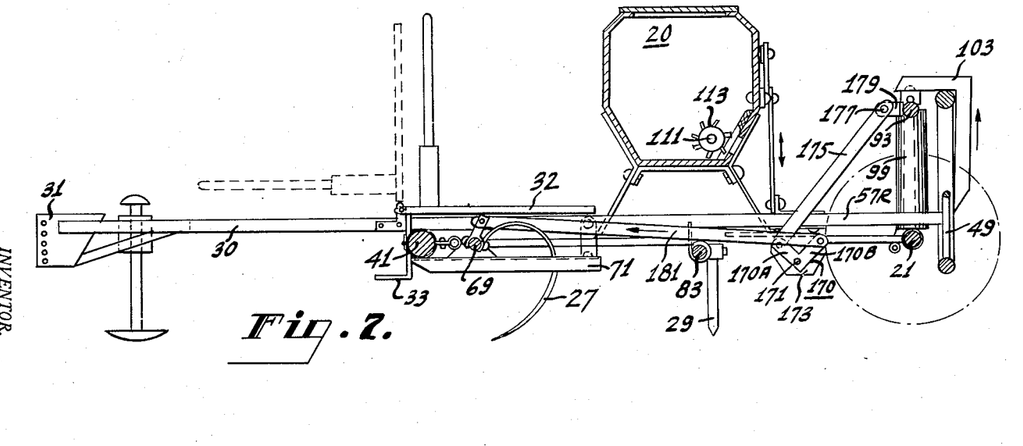

Referring more particularly to the drawings, a general appreciation of the overall structure of the illustrated seed planter, embodying the principles of the present invention, will be particularly aided by preliminary attention to the plan view of the machine in Fig. 1, and the side elevation of Fig. 2. The forward end of the machine is toward the top of Fig. 1 and toward the right in Fig. 2.

An elongated seed hopper 20, of a generally conventional cross-section, is fixedly mounted on a rigid frame that extends forwardly from the axle 21 of a pair of road wheels 22 upon which the entire apparatus rides, the longitudinal axis of the hopper 20 being parallel to the axle 21. An array of earth-tilling elements 25 extends across the width of the machine to the rear of the axle, and is supported by an external framework which is pivotally coupled at the front of the machine to the hopper-supporting frame. An additional row of similar tilling elements 27 is provided at the front of the machine, and also supported by the aforementioned external framework. A series of cross-tilling elements 29 is located behind the row of elements 27 and beneath the hopper 20, and supported from the hopper-supporting frame. A braced V-shaped draw-bar 30, is provided, extending from the front of the external framework to a conventional tractor hitch 31, to which the vehicle drawing the planting machine may be coupled. A hinged loading platform 32, having retractable steps 33, is also provided at the front of the machine.

A more detailed explanation of the structure of the external framework and the hopper-supporting frame mentioned in the general description above will now be made with particular reference to Fig. 3 in which there is presented a perspective view of the machine with the platform, seed hopper, and other appendages removed to give a clear view of the skeletal framework of the machine.

The external framework includes a pair of parallel side-bars 39 falling outside the road wheels 22, and including upswept portions at either end terminating in respective front and rear cross-bars, 41 and 43 respectively. A central cross-bar 45 extends between the apices of a pair of vertical projections 47 of general inverted-V form on the side-bars 39. Extending downwardly from the central cross-bar 45 is a strengthening truss arrangement including a pair of inner diagonal struts 49, a pair of vertical bars 51, a pair of outer diagonal struts 53, and a bottom cross-bar 55. The truss is rigidly connected to the front cross-bar 41 by a pair of parallel linking bars 57L, 57R extending forward from intermediate points on the respective inner diagonal struts 49. Extensions of the linking bars 57 beyond the front cross-bar 41 form the V-shaped draw-bar 30. A pair of cross-connecting bars 59 each describing a general L-shape in a vertical plane near the front of the machine, extend between the respective side-bars 39 and the respective linking bars 57. The draw-bar is braced by members 30a which are secured to the linking bars 57 and provide support for the hinged loading platform 32 (not shown in Fig. 3).

Figures 3, 4A:
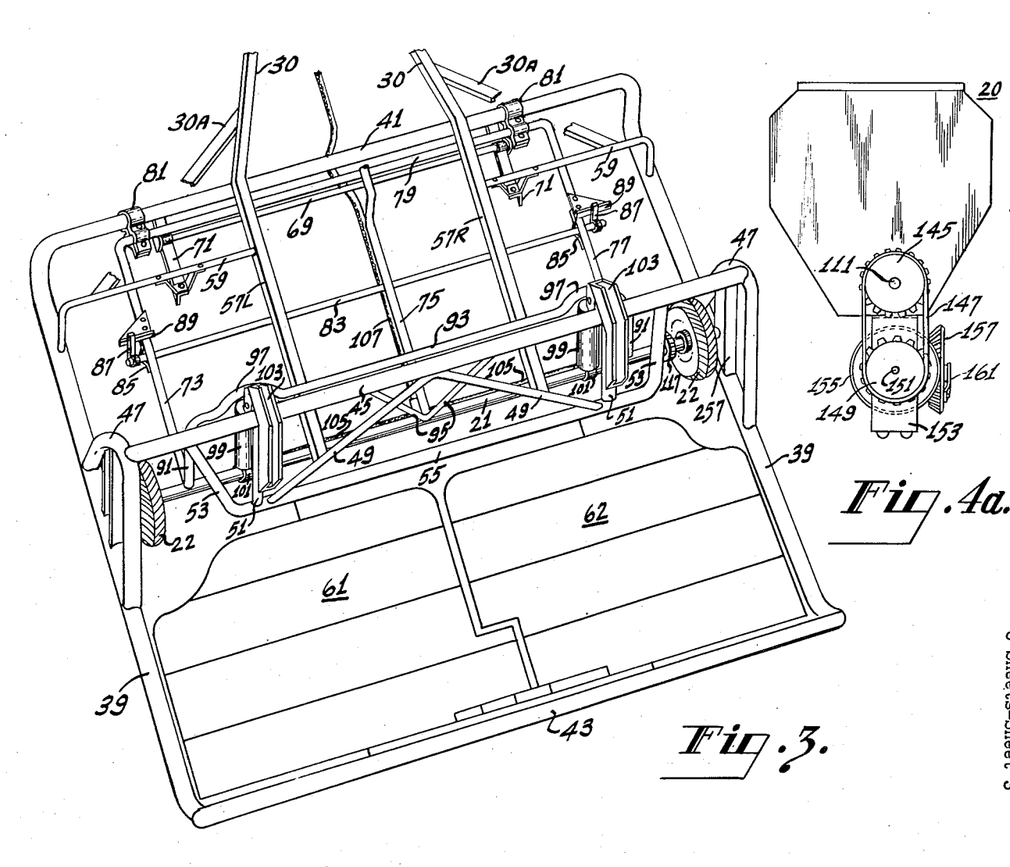
Figure 3 is a skeletonized perspective view of the machine.
Figure 4a is a detail side elevation, viewing the machine's seed hopper from the left of Figure 1.

The framework described in detail above provides the support for the perviously mentioned rear-end array of tilling implements 25, the array comprising a pair of side-by-side cultivator units 61 and 62 (illustrated in outline only in Fig. 3). As particularly illustrated in Figs. 1 and 2, each cultivator unit comprises a plurality of the tilling implements 25, illustratively shown as flexibly bowed tines (of spring steel, for example), arranged in a staggered relationship on a series of parallel rotatable shafts 65, the latter being linked for common rotation by an adjusting lever 67 to adjust the "bite" taken by the tines in the soil. A conventional spring catch and notched plate arrangement is associated with the adjusting lever 67 to permit locking of the shafts at the desired position of rotation. Each cultivator unit is connected to the supporting framework at two points: the front of each unit is centrally pivotally coupled to the truss bottom cross-bar 55, and the rear of each unit is centrally pivotally coupled to the rear cross-bar 43. The pivotal connections at front and rear permit each unit to rotate about an axis parallel to the direction of travel of the machine. A stabilizer, coupling the rear edges of the two units, to be discussed in more detail subsequently, limits, however, such rotation of the cultivator units.

The external framework also provides a support for the previously mentioned row of tilling implements 27 at the front of the machine. The implements 27, also illustrated as bowed tines (Fig. 2), are mounted on a rotatable shaft 69. Although the tines 27 are not shown in Fig. 3, it may be there observed that the shaft 69 is journaled at each end in bearings mounted on angle bars 71, each of the angle bars 71 being secured between the front cross-bar 41 and the horizontal segment of one of the cross-connecting bars 59.

The hopper-supporting frame includes three spaced parallel support bars 73, 75, and 77, extending forwardly from the axle 21, and terminating in another front cross-bar 79. A pivotal coupling is provided between the front cross-bar 79 of the hopper-supporting frame and the front cross-bar 41 of the external framework via coupling straps 81.

The hopper-supporting frame also serves to support the previously mentioned series of cross-tilling implements 29, positioned behind the front row of tines 27. The implements 29 (not illustrated in Fig. 3, but illustrated in Fig. 2) comprise flexible spikes, presenting a relatively sharp, narrow surface in the direction of travel, and a relatively broad surface in the cross-tilling directions perpendicular thereto. The spikes 29 are mounted on a rotatable and translatable shaft 83, journaled in so-called half bearings 85 suspended beneath the support bars 73, and 77. Pivoting of the spikes 29 backwards is limited by the provision of lugs 87, projecting from the shaft 83 at each end, and adapted to engage stops 89 mounted on the outer support bars 73 and 77. It will be noted that the stops 89 are elongated to insure the desired detention of the lugs 87 irrespective of the lateral position of the shaft 83 in its cycle of translatory motion.

The axle 21 also supports an upwardly extending truss arrangement including vertical bars 91, a top cross-bar 93, and diagonal struts 95. Arcuate bends 97 are provided near each end of the top cross-bar 93 to accommodate the upwardly extending hydraulic cylinders 99. Each cylinder is secured at its base to the axle 21 by a mounting collar 101, which is permissive of rotation of the cylinder about the axle. The piston 100 of each cylinder 99 is coupled to lift bar 103. The lift bars 103, may, as illustrated, take the form of channel bars, each rigidly secured to a vertical truss bar 51 and extending in the shape of an inverted-L across cross-bar 45. The cylinders are supplied with fluid, when required, through respective hose lines 105, fed from the hydraulic control source in the drawing vehicle through a common hose line 107. When fluid is pumped into the cylinders 99, the cylinder pistons are elevated. It will be appreciated that the elevating force transmitted to the bars 51 results in a lifting of the external framework, raising the cultivator units 61 and 62 out of contact with the soil. A more detailed explanation of this raising action and mechanical movements actuated thereby will be presented subsequently, after first considering in more detail the actions of the machine during normal sowing operations, i. e., when the hydraulic cylinders are not energized and the external framework rests in its normal lowered position.

It should be noted that in the following description of the machine actions during the sowing operation, Figs. 4, 4a, and 5 will be of particular aid, in addition to the general views of Figs. 1 and 2, in achieving an understanding of the positioning and cooperative relationships of the discussed components.

Extending longitudinally within the hopper 20 and journaled in bearings at each end thereof is a rotatable paddle wheel shaft 111. Mounted at regularly spaced intervals along the shaft 111 for rotation therewith are a plurality of paddle wheels 113. Rotation of the paddle wheels 113 serves to eject substantially uniform streams of seed through apertures in the rear wall structure of the hopper 20, the paddle wheel positions being in substantial registry with the rear wall apertures. Means for controlling the effective aperture size are provided, and will be discussed at a subsequent point in the description.

The rotary motion required of the paddle wheel shaft 111 for seed ejection is derived from the rotation of the road wheels 22. The energy transmission is as follows. A sprocket wheel 117 is mounted for rotation with the road wheels 22, a chain drive 119 conveying the rotary motion of sprocket wheel 117 to a second sprocket wheel 121 (Figs. 4 and 8), mounted on a shaft 123, the latter being journaled in a bearing plate assembly 125 secured to and projecting rearwardly and outwardly extending from the hopper end wall. The shaft 133 supports a third sprocket wheel 139, the rotation of which is transmitted by a second chain drive 141 to the paddle wheel drive sprocket 143, and thus to the paddle wheel shaft 111 to which sprocket wheel 143 is secured.

As briefly explained previously, a unique feature of the subject machine is the provision for cross-tilling of the soil prior to the broadcasting of seed thereon. As has been observed, the cross-tilling spikes 29 are mounted on shaft 83 which is supported in half bearings 85 suspended beneath the hopper-supporting frame. Attention is now turned particularly to Figs. 4 and 4a for an understanding of the drive system for imparting the reciprocating motion to shaft 83 required to effect the desired cross-tilling. At the end of paddle wheel shaft 111 remote from the drive sprocket 143, a driven sprocket wheel 145 is mounted for rotation with the shaft 111. A third chain drive 147 transfers this rotary motion to sprocket wheel 149 mounted on a shaft 151 which rotates in a bearing plate 153 suspended from the bottom of the hopper 20. The shaft 151 turns a first bevel gear 155 mounted on the inner end of shaft 151. Meshing with the first bevel gear 155 is a second bevel gear 157, rotating about an axis parallel to the direction of travel of the machine in bearing plate 159 also suspended from the hopper bottom. A crank 161, eccentrically secured to the second bevel gear 157, translates the gear's rotary motion to a reciprocating motion of a slide bar 163, sliding backward and forward in apertures of a pair of guide plates 165 (suspended from the hopper bottom) in a direction perpendicular to the direction of travel of the machine. Attached to the slide bar 163 is a downwardly extending flat plate 167, having a rectangular notch in its bottom edge. An annular collar 169 on the spike shaft 83 fits within this notch. Thus, the reciprocating motion of the slide bar 163 is transmitted, via the engagement of the notch of plate 167 with collar 169, to the spike shaft 83 to effect the desired cross-tilling action.

With the foregoing description in mind, an understanding of the actions of the machine during the sowing operation is more readily achieved. As the machine is drawn across the ground, the front row of tines 27 effect a preliminary agitation of the soil, being particularly adapted to break up and level the tread-marks of the drawing vehicle. The reciprocating spikes 29, with their cross-tilling effect, effect a further leveling, even breaking up the furrows left by the front row of tines 27, so as to present a substantially uniform soil surface to the streams of broadcast seed. A substantially uniform ejection of seed from the hopper 20 is effected by the rotating paddle wheels 113. The cultivator units 61 and 62 at the rear agitate the soil to cover the deposited seed, their pivotal coupling to the external framework permitting them to follow the varying contour of the land.

It is now in order to consider in more detail the mechanisms and movements for raising the earth-contacting implements and otherwise altering the machine from its sowing condition when such actions are required, as, for example, when the sowing of a strip of land has been completed and it is desired to turn the apparatus.

Figures 6, 14:
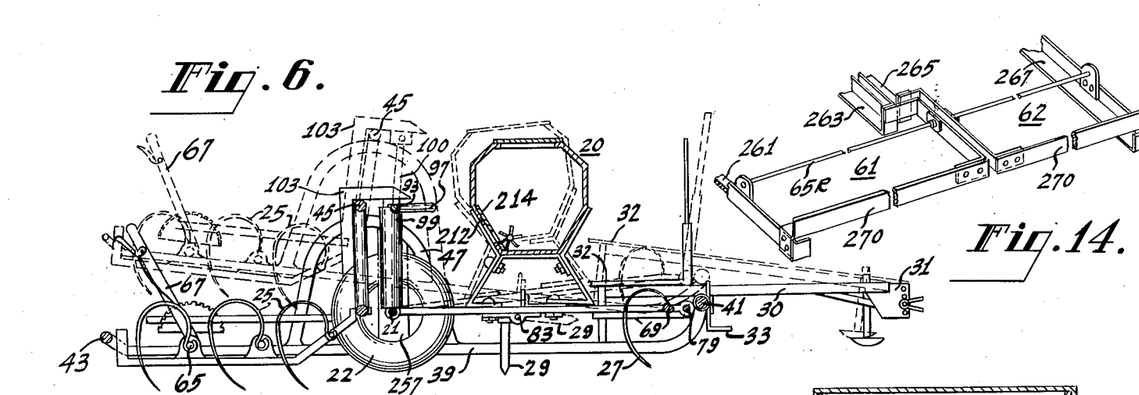
Figure 6 is a longitudinal sectional view taken along the lines 6—6 in Figure 1, the altered positions taken by components of the machine when the machine's elevating system is actuated being indicated in dotted lines.
Figure 14 is a fragmentary perspective view of the frames of cultivator assemblies of the machine.

A longitudinal sectional view of the machine, as shown in solid lines in Fig. 6, illustrates the normal positions of the machine frameworks and elements supported thereby; i. e. the positions assumed during actual sowing operations. When the hydraulic lifting system is actuated by forcing liquid into the hydraulic cylinders 99 to elevate the pistons 100, these positions are, however, altered, as illustrated by the dotted-line representation of the machine in Fig. 6. The degree of movement of the frameworks in response to the actuation of the hydraulic lifting system has been considerably exaggerated in this illustration to facilitate an understanding of the actions involved.

As noted previously, the upper ends of the pistons 100 are coupled to the inverted-L lift bars 103, the latter being secured to the vertical bars 51 of the transverse truss structure of the external framework. Thus, as the pistons are elevated, the external framework is raised. Since the external framework is rigidly secured to the V-shaped draw-bar 30, the elevation of the pistons results in the pivoting of the external framework and draw bar as a unitary rigid structure about the point of connection of the tractor hitch 31 to the drawing vehicle.

The rear end of the external framework, remote from the tractor hitch pivot point, is subject to the greatest elevation, sufficient to raise all of the tines 25 of the rear-end array out of contact with the ground. The front-end array of tines 27 is also elevated by the framework's pivotal motion, but in view of its support at the front thereof, the elevation is necessarily of a lesser order of magnitude than the elevation of the rear tines 25. Thus, in order to insure that the tines 27 do not remain extending into the soil, means are provided for rotating the supporting shaft 69 in response to the raising of the external framework to retract the tines 27 from their normal ground-piercing position, as indicated by the dotted-line representation of the retracted tines 27 in Fig. 6.

The cross-tilling spikes 29, although not secured to the external framework but rather supported by the axle-based hopper carriage, are also lifted somewhat by the upward pivoting of the external framework. This may be more readily understood, if it is appreciated that as the front cross-bar 41 of the external framework rises, the front cross-bar 79 of the hopper carriage, coupled to cross-bar 41 by straps 81, rises with it. Thus, as the rear end of the external framework swings upwardly about a pivot point at the front of the machine, the front end of the hopper carriage also swings upwardly, pivoting the hopper carriage about the road-wheel axle 21. The backward tilt of the seed hopper 20 in the position shown in dotted-lines in Fig. 6 points up this pivotal motion of the hopper carriage.

Such elevation of the spikes 29 as is effected by the pivotal motion of the hopper carriage is however supplemented, to insure the spikes' clearance of the ground, through the provision of means for rotating the spike-supporting shaft 83 in response to the raising of the external framework to swing the spikes 29 forwardly toward a substantially horizontal position, as illustrated by the dotted-line position of the spikes 29 in Fig. 6.

With the foregoing explanation of Fig. 6 as a basis, the description may now proceed to a more detailed consideration of how the relative motion between the external framework and the hopper carriage, occurring when the hydraulic cylinder pistons are elevated, is utilized in the illustrative machine to automatically perform a number of desired "disabling" functions; namely, (a) the rotation of the shaft 69 to retract the front tines 27, (b) the disabling of the rotary drive for the paddle-wheel shaft 111, and thereby the disabling of the reciprocating drive for spike shaft 83, (c) the rotation of the shaft 83 to clear the spikes 29, and (d) the sealing of the seed ejection apertures 115 in the hopper rear wall. An explanation of (a) will be particularly aided by reference to Fig. 7, of (b) by reference to Figs. 4 and 8, of (c) by reference to Figs. 9, 10, and of (d) by reference to Figs. 9, 11 and 12.

In explanation of operation (a), i. e. the retraction of front tines 27, it may be noted that the apparatus illustrated in the detail sectional view of Fig. 7 includes a bellcrank lever 170 pivotally mounted at its apex on pin 171 projecting from the surface of a bracket 173. The upper end of bracket 173 is rigidly secured to one of the bars (57R) that link the front cross-bar 41 and the transverse truss struts 49 of the external framework. The bracket 173 and the pin 171, and hence the apex of bellcrank lever 170, will thus rise as the external framework is elevated. The end of the normally forwardly extending arm 170a of lever 170 is pivotally coupled to the lower end of a linking rod 175, the upper end of rod 175 being pivotally mounted on pin 177 projecting from the surface of a bracket 179. The bracket 179 is affixed to the top cross-bar 93 of the axle-supported truss that is effectively a segment of the hopper carriage assembly. While, as noted previously, the hopper carriage does undergo a pivotal motion in response to the actuation of the hydraulic lifting system, the motion is relatively slight and particularly so for portions of the assembly in proximity to the axle 21, which serves as the axis of rotation of the pivoting carriage. Thus, cross-bar 93, bracket 179, and pin 177 may be considered as essentially stationary with respect to the rising pin 171 and apex of bellcrank lever 170. Rotation of the bellcrank lever 170 about the pin 171, in a counterclockwise direction (as viewed from the left wheel side of the machine in Fig. 7) necessarily results as the pin 171 rises. The counterclockwise rotation of the normally rearwardly extending arm 170b of lever 170 is transmitted to the rotatable shaft 69, to effect the desired retraction of the front tines 27, by means of a linking rod 181, pivotally coupled at one extremity to the free end of lever arm 170b and at the other to an upward projection of the shaft 69.

Figure 4:
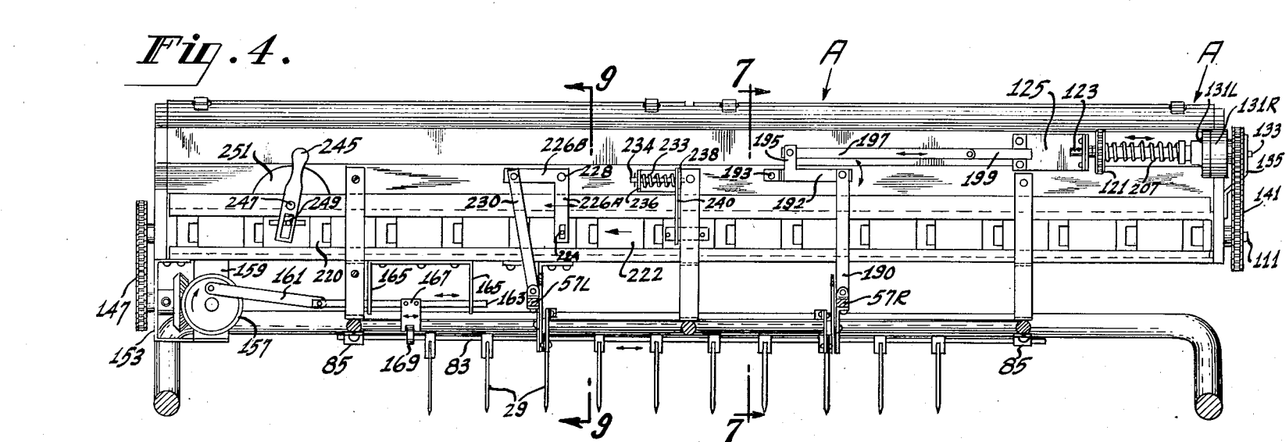
Figure 4 is a lateral sectional view taken along the lines 4—4 in Figure 1.
Figure 5:
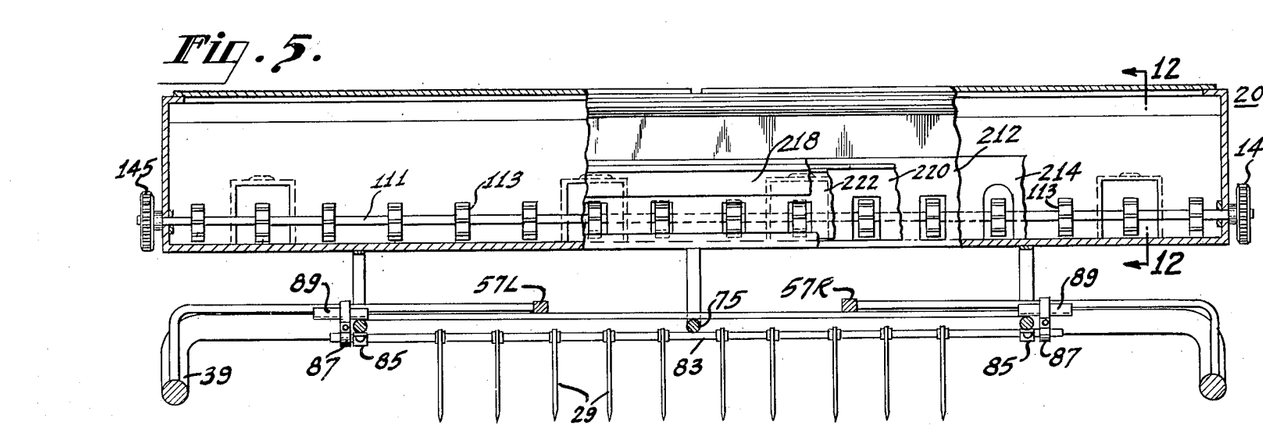
Figure 5 provides a partially broken away view of the machine's seed hopper in rear end elevation.
Figure 8:
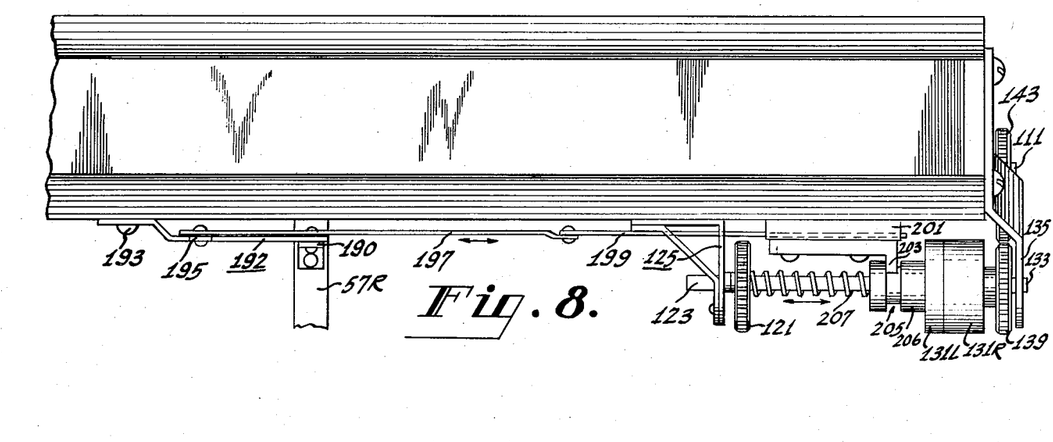
Figure 8 is an enlarged detail plan view taken from the position A—A in Figure 4.

In explanation of operation (b), i. e. the disabling of the rotary drive for paddle-wheel shaft 111, and thereby the disabling of the reciprocating drive for spike shaft 83, the vertical sectional view of Fig. 4 and the enlarged detail view (plan) of Fig. 8 are of particular aid. A vertically projecting rod 190 is secured at its lower end to the top of linking bar 57R, and pivotally coupled at its upper end to the free end of a normally horizontal lever 192. The opposite end of lever 192 pivots on pin 193 projecting from the rear wall of hopper 20. The lever 192 is provided with an upwardly extending projection 195. A linking rod 197 is pivotally coupled at one end to the lever projection 195 and at the opposite end to a slide rod 199 that passes through slots in the plates of the bearing plate assembly 125 that supports sprocket wheel shaft 123. The remote end of slide rod 199 slides in a guide 201, and has a projecting lug 203 that rides in a channel 205 formed by an annular depression in the surface of the shoulder 206 of the friction clutch member 131L (the left-hand member viewed from the rear of the machine, as in Fig. 4).

The operation of the elements set forth above in effecting the automatic declutching or decoupling may be briefly described as follows: When the external framework is raised by actuation of the hydraulic cylinders, the linking bar 57R rises and forces the vertical rod 190 upwardly, causing lever 192 to rotate counter-clockwise (as viewed in Fig. 4) around pin 193 as an axis. The rotation results in a motion of lever projection 195, and the end of linking rod 197 coupled thereto, upwards and to the left. The leftward motion is transmitted to slide rod 199 which retracts the left-hand-clutch member 131L from frictional engagement with the right-hand-clutch member 131R.

Thus, though the member 131L, which is secured to the sprocket wheel shaft 123, continues to rotate with movement of the road wheels, the clutch disengagement prevents transmission of the rotary movement to the paddle-wheel shaft 111, and thereby terminates ejection of seed through the ports. The reciprocating motion of spike shaft 83 also ceases, since this is derived from the rotation of paddle-wheel shaft 111. When the external framework is lowered and normal sowing operation is to be resumed, the helical spring 207, surrounding shaft 123 and abutting shoulder 206 and sprocket wheel 121, positively encourages return of the clutch members 131L, 131R to frictional engagement.

The achievement of operation (c), i. e. the rotation of shaft 83 to raise the spikes 29 clear of the ground, may best be appreciated by reference to the side and perspective detail views of Figs. 9 and 10. It will be noted that the mechanisms employed for operation (c) are similar in many respects to those employed for operation (a) previously described: A bellcrank lever 170' pivots at its apex on a pin 171' projecting from a bracket 173' secured to linking bar 57L, the bellcrank lever apex thus being lifted when the external framework is raised. In contrast with the operation (a) arrangement, the rearwardly extending arm 170b' of lever 170' is linked (via linking rod 175', pin 177', and bracket 179') to the truss cross-bar 93 of the relatively stationary hopper carriage assembly, while the forwardly extending arm 170a' is linked to the shaft (83) to be rotated. Rotation of the bell-crank lever 170' as the bar 57L rises is thus in a counterclockwise direction as viewed from the right wheel side of the machine in Fig. 9. Rotation of arm 170a' in this direction is transmitted by linking rod 181' to the shaft 83, to rotate the spikes 29 forward and upward out of the soil. The enlarged forward end of rod 181' is provided with an aperture through which passes the lateral arm of a handle-like member 210 projecting from the shaft 83. It will be appreciated that this manner of linking the actuating lever 170' to the shaft 83 is compatible with the reciprocating motion to which shaft 83 is normally subject, and permits raising of the spikes 29 at any stage of the reciprocation cycle. It will be noted that a guide 211 is secured to the bottom of the hopper 20 and provided with an arcuate notch which serves as a guide channel for the upper extremity of the enlarged forward end of rod 181'. The guide 211 restricts any tendency of this forward end to follow the reciprocating motion of handle 210 and shaft 83, and insures proper alignment of the rod 181' with the actuating lever 170'.

The apparatus for effecting operation (d), i. e. for closing off the seed ejection apertures at the rear of the hopper, is shown in the views of Figs. 4 and 9, and a close-up view thereof is presented in the enlarged detail view of Fig. 11. Attention may first be directed, however, to the enlarged cross-sectional view of hopper 20 in Fig. 12 for appreciation of the general structure of the hopper, and the elements that define and control the seed ejection apertures in particular. It will be noted that the cross-section of the illustrated hopper 20 is of a more or less conventional octagonal shape. Abutting the inside surface of the lower slanted section 212 of the hopper rear wall is an elongated block 214, provided with a series of arch-like openings or archways 216 into which respective paddle wheels 113 extend, each archway 216 communicating with an aperture in the rear wall section 212. Affixed along the outer surface of rear wall section 212 and the hopper bottom is a guide assembly 218 providing a slideway for a pair of adjacent apertured slides 220 and 222. Longitudinal adjustment of the position of either slide controls the degree of registry of the respective slide apertures with the apertures of rear wall section 212. As will be more fully appreciated from a subsequent detailed description, adjustment of the inner slide 220 is utilized as a control of the effective size of the openings through which seed is broadcast to the ground during the sowing operations, and thus serves as a seeding rate-control. The outer slide 222 is used in the automatic sealing of the hopper openings of the aforementioned operation (d), as shall now be explained in detail.

A pin 224 projecting from an intermediate one of the solid panels of the outer slide 222, fits into a slot near the lower end of the downwardly extending arm 226a of a bellcrank lever 226. The bellcrank lever 226 pivots at its apex about a pin 228 projecting from the rear wall of the relatively stationary hopper. A vertical connecting rod 230 is pivotally coupled at one end to the free end of arm 226b of lever 226, and at the other end to the vertical projection of member 232, the latter being rigidly secured to the linking bar 57L of the external framework assembly. It will be appreciated that when the external framework is raised, the lifting of connecting rod 230 will force the bellcrank lever to rotate in a clockwise direction (as viewed from the rear of the machine in Figs. 4 and 11), thus shifting the slot-engaged pin 224, and the outer slide 222 to which it is affixed, to the left. The longitudinal motion of slide 222 is sufficient to shift the slide apertures completely out of registry with the apertures of the hopper rear wall section 212 and place the solid panels of the slide in such registry, sealing off the seed exits.

As will be particularly noted in Fig. 4, a spring return assembly is provided for slide 222 to insure that the slide apertures are returned to their normal positions of registry with the hopper wall openings when the external framework is lowered. A helical spring 233 surrounds a shaft 234, which extends between and is supported by plates 236 and 238 affixed to the hopper rear wall. The shaft 234 pierces the upper end of vertically projecting arm 240 of slide 222, the arm 240 fitting against the inner surface of plate 238. The spring 233 is compressed by movement of arm 240 toward plate 236 when slide 222 is shifted to its aperture-sealing position. When the external frame work is lowered, the expanding spring positively encourages return of the slide 222 to its proper position for sowing operations.

The mechanism for utilizing the inner slide 220 for a seeding rate control is also particularly illustrated in Fig. 4. An adjusting lever 245 pivots centrally about a pin 247 projecting from the hopper rear wall. A rectangular slot in the lower end of lever 245 engages a pin 249 which projects from the outer surface of the inner slide 220 through a slot in a solid panel of the outer slide 222. The slot in slide 222 is elongated in the slide's longitudinal direction so that pin 249 in any position of adjustment will not provide an obstruction to the full aperture-sealing shift of slide 222. It will be appreciated that rotation of the lever 245 causes longitudinal movement of slide 220 due to the engagement of slot 246 with pin 249. As the longitudinal movement of slide 220 varies the degree of registry of its apertures with the apertures of rear wall section 212, a manual adjustment of the effective size of the openings through which seed will be ejected, and thus the quantity of seed that is to be broadcast per unit distance of travel of the machine, is thereby provided. A suitably calibrated seeding rate dial 251 may be positioned behind the upper end of adjusting lever 245.

Figures 12, 13:
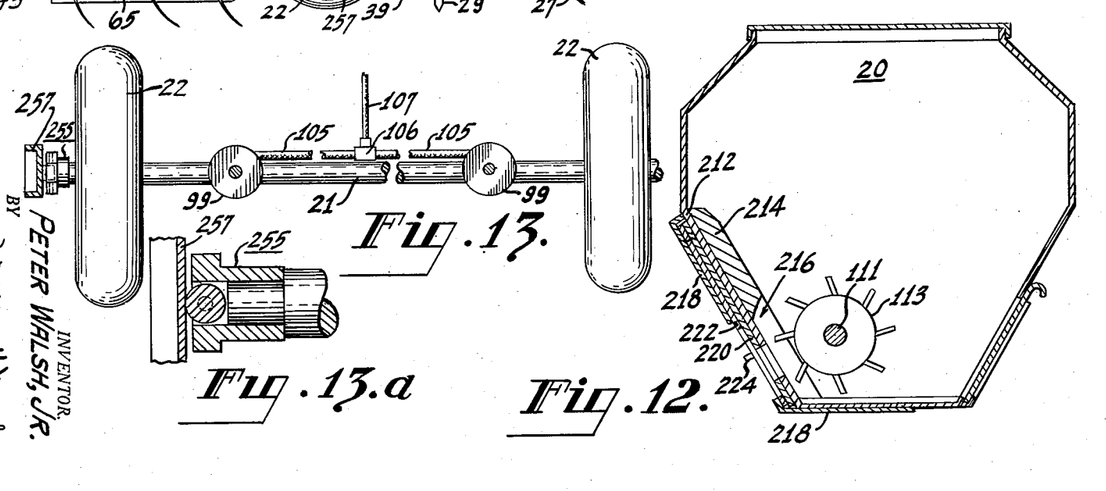
Figure 12 is an enlarged vertical section through the hopper taken along lines 12—12 in Figure 5.
Figure 13 is a simplified plan view, partly broken away and partly in section, of the road wheel assembly of the machine.

In the simplified view of Fig. 13, viewing the axle 21 and road wheels 22 from above, an unobstructed showing is made of the hose line feeders 105 to hydraulic cylinders 99, and the T-connector 106 by which the feeders are coupled to the main hose line 107. Fig. 13 also illustrates one of the axle thrust bearings 255 that are provided at the axle extremities, engaging vertical plates 257. Each vertical plate 257 is positioned within a respective one of the inverted-V projections 47 of the external framework, and secured at its bottom end to a respective sidebar 39 and at its top end to the inverted-V projection 47. The vertical plates 257 provide a contacting surface for the bearings 255 irrespective of the raising or lowering of the external framework. The bearings 255 are illustrated as being of a roller type, readily permissive of the vertical motion of the contacting plates 257. A vertical cross-section of an illustrative form which such roller bearings may take is shown in Fig. 13a. It will of course be appreciated that other forms of roller bearings, ball-type bearings, etc., may be substituted therefor.

In Figs. 14, 15, and 16, particular detail views illustrate various features of the cultivator units 61 and 62. In the fragmentary perspective view of the unit frames in Fig. 14, the runners 261, 263, and 265, 267, on which the respective cultivator units slide along the ground are partially shown. It will be noted that the respective inner runners 263 and 265 do not extend all the way to the rear of the cultivator unit frames, but rather terminate at dove-tailing bends in the inner frame sides. The outward bend of the inner frame side of cultivator unit 61 permits an extension in length of the rearmost tine-supporting shaft (65R) of the cultivator unit 61, to accommodate positioning of a tilling implement immediately behind the foreshortened runners 263, 265 to avoid ridging and insure proper tilling and seed covering in this region of the swath of land subject to sowing.

As illustrated in the detail elevation of Fig. 15, means may be provided for adjusting the height at which the cultivator units 61 and 62 are suspended from the cross-bars 43 and 55 of the external framework. The front and rear cross-bars 270 of each cultivator unit frame have centrally affixed thereto a height adjusting plate 272. A series of vertically aligned apertures (the lower ones being in registry with apertures in the respective cross-bar 270) in each plate 272 are provided for selectively receiving the pin 274 by which pivotal coupling to the appropriate cross-bar of the external framework is effected. An additional control over the depth of tilling is thus provided.

In Fig. 16, the fragmentary perspective view of a flexible stabilizer coupling between the two cultivator unit frames is illustrated in detail. An elongated stabilizing rod 276 of flexible steel is rigidly secured at one end to a bracket 277 on the rear cross-bar 270 of the frame of cultivator unit 62. The rod 276 extends between respective pairs of rollers 280, 282, and 284, the roller pair 280 being mounted on the frame of unit 62 and the roller pairs 282 and 284 being mounted on the frame of unit 61. The rollers readily permit a controlled degree of flexing of the stabilizing rod 276, allowing independent rotation of the respective units about their frame pivots to follow the contour of the land being tilled. However, when the external framework is raised lifting the cultivator units above the surface of the ground, the stabilizing rod 276 limits the rotation of the respective units to prevent excessive "drooping" toward the surface of the ground.

While the details of a specific form of machine have been set forth above in describing an embodiment of the present invention, it will be appreciated that various modifications thereof may be made without departing from the scope of the present invention. In this regard, it may again be noted that many features of the present invention, such as those relating to the raising of the cultivating implements, though particularly described with respect to a seed planter of the broadcast type, may also prove advantageous in use in seed planters of the drill type.

Having thus described the invention, what is claimed is:

1. A seed planter comprising in combination a seed hopper, a wheeled carriage supporting said seed hopper, means responsive to motion of said wheeled carriage for causing the ejection of seed from said hopper, a rigid framework pivotally coupled to said hopper supporting carriage, respective arrays of tilling implements positioned on opposite sides of said seed hopper and supported by said framework, one of said arrays of tilling implements including a rotatable shaft supporting a plurality of said tilling implements, means supported by said carriage for selectively elevating said framework relative to said carriage, means for disabling said seed ejecting means in response to the selective elevation of said framework relative of said carriage, and means for rotating said tilling implement supporting shaft in response to said selective elevation of said framework.

2. A seed planter in accordance with claim 1 also including an additional array of tilling implements supported by said carriage, said additional array including a rotatable and translatable shaft supporting a plurality of said tilling implements, means responsive to motion of said wheeled carriage for subjecting said latter shaft to translatory motion, and means responsive to said selective elevation of said framework for rotating said latter shaft.

3. In a seed planting machine adapted to be drawn on road wheels, the combination comprising an inner frame rigidly secured to the axle of said road wheels, a seed container supported on said inner frame, an outer frame including side members positioned outside said road wheels and including respective front and rear cross bars extending between said side members, a draw bar rigidly secured to said outer frame and extending beyond said front cross bar, a plurality of earth agitating implements supported by said outer frame, and elevating means supported by said axle and effectively coupled to said outer frame for causing, upon actuation thereof, said outer frame and said draw bar rigidly secured thereto to pivot upwardly about the frontwardly extended end of said draw bar.

4. Apparatus in accordance with claim 3 wherein said plurality of earth agitating implements includes a cultivating unit suspended between said rear cross bar and an intermediate cross bar of said outer frame such as to permit rotation of said unit about an axis perpendicular to said axle.

5. Apparatus in accordance with claim 3 wherein said plurality of earth agitating implements includes a row of flexible tines secured to a rotatable shift supported by said outer frame and including means responsive to the pivoting of said outer frame for rotating said shaft upon actuation of said elevating means.

6. In a seed planting machine provided with road wheels, the combination comprising an inner frame rigidly secured to and frontwardly extending from the axle of said road wheels, a seed hopper supported on said inner frame, an outer frame including side members positioned outside said road wheels and including respective front and rear cross bars extending between said side bars, a draw bar rigidly secured to said outer frame and extending frontwardly beyond said front cross bar, means for pivotally coupling said front cross bar to the front end of said inner frame, means suspended from the front of said outer frame for preliminarily tilling the earth over which said planting machine travels, means suspended from said inner frame behind said first-named tilling means for cross-tilling the preliminarily tilled earth in a direction substantially perpendicular to the direction of the preliminary tilling, means included in said seed hopper for broadcasting seed upon the cross-tilled earth, and cultivating means supported from said outer frame to the rear of said seed hopper and adapted to agitate the earth to cover seed broadcast thereon.

7. Apparatus in accordance with claim 6 including selectively operable elevating means supported by said axle for upwardly pivoting said outer frame about the front end of said draw bar whereby said outer frame may be selectively elevated relative to said inner frame.

8. Apparatus in accordance with claim 7 including means responsive to the selective elevation of said outer frame relative to said inner frame for disabling said seed broadcasting means.

9. Apparatus in accordance with claim 7 wherein said first-named tilling means includes a plurality of retractable tines normally occupying an earth-contacting position, said combination also including means for retracting said tines from said earth-contacting position in response to the selective elevation of said outer frame.

10. Apparatus in accordance with claim 7 wherein said cross-tilling means includes a plurality of tilling blades each presenting a relatively narrow surface in the direction of travel of said machine and a relatively broad surface in a direction perpendicular thereto, a common shaft supporting said blades, means for reciprocating said shaft in response to the rotation of said road wheels, means responsive to the selective elevation of said outer frame for disabling said reciprocating means, and means for rotating said common shaft to retract said blades in response to said selective elevation of said outer frame.

11. Apparatus in accordance with claim 7 wherein said seed hopper is provided with an apertured wall, said seed broadcasting means being adapted to eject seed from said hopper through said wall apertures, said combination also including means for sealing said wall apertures in response to the selective elevation of said outer frame.

12. Apparatus in accordance with claim 7 wherein said cultivating means includes a pair of adjacent cultivating implement supporting frames, the rear of each of said latter frames being pivotally coupled to said rear cross bar and the front of each said latter frames being pivotally coupled to an intermediate cross bar of said outer frame such that said pair of frames may independently rotate about respective axes perpendicular to said road wheel axle.

13. Apparatus in accordance with claim 12 also including means for limiting the independent rotation of frames of said pair, said last named means including a flexible bar rigidly secured at one end thereof to one of said pair of frames and slidably engaging with a segment of the other of said frames.

14. In a seed planter including a first frame supporting a seed hopper from which seed is to be sown, and a second frame pivotally coupled to the first frame, apparatus for tilling the ground traversed by said planter prior to the sowing of seed therein comprising in combination a shaft journaled in bearings on said second frame, a plurality of flexible tines projecting from said shaft, means for normally fixing the rotational position of said shaft such that said projecting tines are permitted to contact the ground, and means for selectively retracting said tines from ground contact, said last-named means comprising means for selectively pivoting said second frame relative to said first frame, and means responsive to relative motion between said first and second frames for rotating said shaft.

15. In a seed planter including a first frame supporting a seed hopper from which seed is to be sown, and a second frame pivotally coupled to the first frame, apparatus for transversely tilling the ground traversed by said planter prior to the sowing of seed therein comprising in combination a reciprocable and rotatable shaft supported by said first frame, a plurality of flexible spikes projecting from said shaft, means for normally fixing the rotational position of said shaft such that said projecting spikes are permitted to contact the ground, means for reciprocating said shaft as said seed planter advances, and means for optionally retracting said spikes from ground contact and concurrently terminating said shaft reciprocation, said last-named means comprising means for pivoting said second frame relative to said first frame, means responsive to relative motion between said first and second frames for rotating said shaft, and additional means responsive to said relative motion between frames for disabling said reciprocating means.

16. In a seed planter provided with road wheels, the combination comprising an inner frame supporting a seed hopper from which seed is to be ejected; an outer frame pivotally coupled to the inner frame and including side members positioned outside said road wheels, and a pair of cross bars extending between said side members; cultivating apparatus for covering the ejected seed with earth including a pair of cultivator frames positioned side-by-side between the side members of said outer frame, means for pivotally coupling each of said cultivator frames to said cross bars of said outer frame extending between said side members such that each cultivator frame may independently rotate about a respective central axis substantially parallel to said side members to follow the contour of the ground over which said planter travels; and means for raising said cultivator frames comprising controllable means for pivoting said outer frame relative to said inner frame.

17. Apparatus in accordance with claim 16 wherein said cultivator frames include respective outer ground slides adjacent to respective ones of said side members and extending substantially the full length of the frames, and respective foreshortened, mutually adjacent, inner ground slides, a protrusion of one cultivator frame behind its foreshortened inner slide dovetailing with a comparably located reentrant portion of the other cultivator frame.

18. Apparatus in accordance with claim 16 including means for limiting the independent rotation of said pair of cultivator frames and comprising a flexible stabilizing rod, means for rigidly securing one end of said rod to one of said pair of cultivator frames, and means for receiving the free end of said rod between a pair of rotatable rollers supported by the other of said pair of cultivator frames.

19. Seed planting apparatus comprising the combination of an inner framework, an outer framework pivotally coupled thereto, means for preliminarily tilling the earth over which said apparatus passes, means for subsequently cross-tilling the preliminarily tilled earth in a direction generally perpendicular to the direction of the preliminary tilling, means for broadcasting seed upon the cross-tilled earth, and subsequent earth agitating means for effecting the covering of said broadcast seed with earth, said broadcasting means and said cross-tilling means being supported by said inner framework, said preliminary tilling means and said earth agitating means being supported by said outer framework, said apparatus also including selectively operable means for pivoting one of said frameworks relative to the other.

20. In a seed planter provided with road wheels, the combination comprising a first frame supporting a seed hopper having an apertured wall; a second frame supporting a plurality of tilling implements and pivotally coupled to said first frame; apparatus for ejecting seed from said hopper including a plurality of paddle wheels mounted for rotation on a common shaft in respective positions of registry with said hopper wall apertures, and means for normally providing a coupling between said paddle wheel shaft and said road wheels whereby said shaft is rotated in response to rotation of said road wheels; means for selectively pivoting said second frame relative to said first frame; means for selectively decoupling said paddle wheel shaft from said road wheels in response to the selective pivoting of said second frame relative to said first frame; an apertured slide adapted to slide along said apertured hopper wall in guides secured to said wall, the apertures in said slide normally being in registry with the apertures of said wall, and means responsive to said selective pivoting of said second frame relative to said first frame for moving said slide from said normal position of aperture registry to an out-of-registry position such that said wall apertures are effectively sealed when said paddle wheel shaft is decoupled from said road wheels.

21. Apparatus in accordance with claim 20 also including a second apertured slide adjacent to said first slide and guided along said apertured wall, and means for manually adjusting the position of said slide along said apertured wall, said latter means providing a manual seeding rate control via control of the degree of coincidence of said second slide apertures with said wall apertures.

References Cited in the file of this patent

UNITED STATES PATENTS

| Number | Name | Date |
|---|---|---|
| 252,806 | Scarr | Jan. 24, 1882 |
| 337,525 | Scott | Mar. 9, 1886 |
| 509,946 | Reichwein | Dec. 5, 1893 |
| 645,817 | Lindgren | Mar. 20, 1900 |
| 754,167 | Roby | Mar. 8, 1904 |
| 1,493,448 | Krotz | May 6, 1924 |
| 1,551,564 | Hinrichsen | Sept. 1, 1925 |
| 2,164,639 | Brower | July 4, 1939 |